United States Patent
Kawano et al.

(10) Patent No.: US 9,249,475 B2
(45) Date of Patent: Feb. 2, 2016

(54) FERRITIC STAINLESS STEEL

(75) Inventors: Akinori Kawano, Shunan (JP); Taichirou Mizoguchi, Shunan (JP); Kouki Tomimura, Shunan (JP); Wakahiro Harada, Shunan (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 280 days.

(21) Appl. No.: 12/936,794

(22) PCT Filed: May 11, 2009

(86) PCT No.: PCT/JP2009/058778
§ 371 (c)(1),
(2), (4) Date: Oct. 7, 2010

(87) PCT Pub. No.: WO2009/139355
PCT Pub. Date: Nov. 19, 2009

(65) Prior Publication Data
US 2011/0033731 A1   Feb. 10, 2011

(30) Foreign Application Priority Data

May 12, 2008   (JP) ................ 2008-124462
Mar. 30, 2009   (JP) ................ 2009-083001

(51) Int. Cl.
C21D 6/00 (2006.01)
B23K 35/30 (2006.01)
C21D 8/02 (2006.01)
C22C 38/02 (2006.01)
C22C 38/04 (2006.01)
C22C 38/26 (2006.01)
F28F 21/08 (2006.01)

(52) U.S. Cl.
CPC .............. *C21D 6/002* (2013.01); *B23K 35/302* (2013.01); *B23K 35/3033* (2013.01); *C21D 8/0226* (2013.01); *C21D 8/0236* (2013.01); *C21D 8/0273* (2013.01); *C22C 38/02* (2013.01); *C22C 38/04* (2013.01); *C22C 38/26* (2013.01); *F28F 21/083* (2013.01); *B23K 2203/04* (2013.01); *Y10T 428/12979* (2015.01)

(58) Field of Classification Search
CPC .... C21D 6/002; C21D 8/0226; C21D 8/0236; C21D 8/0273; F28F 21/083; C22C 38/02; C22C 38/04; C22C 38/26; B23K 35/302; B23K 35/3033; B23K 2203/04; Y10T 428/12979

USPC .............. 428/685; 420/34, 36–39, 60–63, 70; 148/325, 609

See application file for complete search history.

(56) References Cited

U.S. PATENT DOCUMENTS

| 4,461,811 | A | 7/1984 | Borneman et al. |
| 5,512,239 | A | 4/1996 | Fujiwara et al. |
| 7,056,398 | B2 * | 6/2006 | Yazawa et al. ................ 148/610 |
| 2002/0117239 | A1 | 8/2002 | Oku et al. |
| 2004/0244884 | A1 | 12/2004 | Hideshima et al. |
| 2006/0225820 | A1 * | 10/2006 | Hamada et al. ............... 148/610 |
| 2009/0165905 | A1 | 7/2009 | Hideshima et al. |
| 2010/0282372 | A1 | 11/2010 | Hirakawa et al. |

FOREIGN PATENT DOCUMENTS

| CA | 2707518 | 7/2009 |
| CN | 1363710 | 8/2002 |
| CN | 1572895 | 2/2005 |
| EP | 1 308 532 | 5/2003 |
| JP | 03-004617 | 1/1991 |
| JP | 03-277744 | 12/1991 |
| JP | 07-292446 | 11/1995 |
| JP | 2642056 | 11/1995 |
| JP | 2003-328088 | 11/2003 |
| JP | 2005-325377 | 11/2005 |
| JP | 2006-257544 | 9/2006 |
| WO | 2009/084526 | 7/2009 |

OTHER PUBLICATIONS

Pradhan, R., "Continuous Annealing of Steel", ASM Handbook, 1991, ASM International, vol. 4, p. 1-24.*
International Search Report for PCT/JP2009/058778, mailed Aug. 18, 2009.
International Preliminary Report on Patentability for PCT/JP2009/058778, mailed Dec. 23, 2010.
Office Action issued with respect to patent-family member Chinese Patent Application No. 200980116784.1, mailed Nov. 23, 2012, and English-language translation thereof.

* cited by examiner

*Primary Examiner* — Roy King
*Assistant Examiner* — Caitlin Kiechle
(74) *Attorney, Agent, or Firm* — Greenblum & Bernstein, P.L.C.

(57) ABSTRACT

A ferritic stainless steel suited for use as a member for heat exchangers to be brazed with Ni-based filler metal or Cu-based filler metal, comprising, on the basis of mass percent, C: 0.03% or less, Si: 3% or less, Mn: 2% or less, P: 0.05% or less, S: 0.03% or less, Cr: from 11 to 30%, Nb: from 0.15 to 0.8%, and N: 0.03% or less, wherein the balance is composed of Fe and incidental impurities, and wherein a value A determined by the following equation is 0.10 or greater: $A = Nb - (C \times 92.9/12 + N \times 92.9/14)$.

17 Claims, 3 Drawing Sheets

FERRITIC STAINLESS STEEL

TECHNICAL FIELD

The present invention relates to a ferritic stainless steel suited for use as a member to be brazed. The invention also relates to a ferritic stainless steel particularly suited for use as a member constituting a heat exchanger.

BACKGROUND ART

With a view to effectively re-using a heat exhausted gas, heat exchangers have been used in a variety of fields such as heat exchange plates of a gas-fired water heater or Eco-cute body. In the gas-fired water heater, a mixed liquid containing nitric acid, sulfuric acid, and chlorine is generated as a result of condensation of the components of an exhaust heat gas and there is therefore a fear of deterioration in corrosion resistance occurring, after liquid/liquid heat exchange, on the heat exchange plate due to chlorine contained at a high concentration. In addition, since Ni-based filler metal or Cu-based filler metal is employed for joining of parts, it is necessary to avoid deterioration in ductility/toughness of them due to coarsening of the structure upon brazing. For members which are required to have corrosion resistance and brazing ability, copper or copper alloy has conventionally be used. Copper is inferior in strength so that the member must be thickened in order to heighten its strength, which leads to a problem of cost increase. Accordingly, austenitic stainless steels such as SUS304 and SUS316 have so far been used as a substitute for copper in a steel member for heat exchangers.

A member to be brazed is required to have the following properties:
(1) Various good brazing abilities such as brazing ability with Ni-based brazing metal, brazing ability with Cu-based brazing metal and torch brazing ability with inexpensive brass-based filler metal or the like.

Further, when a member to be brazed is a metal member of heat exchanger (refrigerant pipe or water pipe) etc, it is further required to have the following property:
(2) Good corrosion resistance under an environment of nitric acid or sulfuric acid in a condensate derived from a combustion gas or good crevice corrosion resistance under an aqueous environment having a high chlorine concentration.

As a material having such properties and a good brazing ability, a ferritic stainless steel is investigated in Japanese Patent No. 2642056.

[Patent Document 1] Japanese Patent No. 2642056

SUMMARY OF THE INVENTION

Problem to be Solved by the Invention

Ferritic stainless steels have a thermal expansion coefficient smaller than that of austenitic stainless steels. In addition, their material cost is usually more inexpensive than austenitic stainless steels. Ferritic stainless steels have been used frequently as an exhaust heat recovery member or a muffler member in an exhaust gas path of automobiles. When a material is brazed with Ni or Cu, or torch brazed with brass, however, the material should be exposed to temperatures as high as 1000° C. or greater. Under such high temperature, ferritic stainless steels tend to cause diffusion compared with austenitic stainless steels, leading to deterioration in ductility or toughness due to coarsening of crystal grains.

Japanese Patent No. 2642056 described above discloses a ferritic stainless steel for heat exchanger having a good brazing ability. However, suppressing coarsening of crystal grains upon brazing or improving crevice corrosion resistance under aqueous environment are not intended.

An object of the present invention is to provide a ferritic stainless steel suited as a member to be subjected to brazing such as brazing with Ni-based filler metal, brazing with Cu-based filler metal, or torch brazing with brass-based filler metal. Another object of the present invention is to provide a ferritic stainless steel suited as a material for a metal member such as a heat exchanger member having both brazing ability and corrosion resistance under an environment where chlorine-rich water is present.

Means for Solving the Problems

The above-described objects can be achieved by using a ferritic stainless steel comprising, on the basis of mass percent, C: 0.03% or less, Si: 3% or less, Mn: 2% or less, P: 0.05% or less, S: 0.03% or less, Cr: from 11 to 30%, Nb: from 0.15 to 0.8%, and N: 0.03% or less, wherein the balance is composed of Fe and incidental impurities, and wherein a value A determined by the following equation is 0.10 or greater: $A=Nb-(C\times 92.9/12+N\times 92.9/14)$.

A maximum diameter of the precipitate in the ferritic stainless steel (d) is preferably 0.25 μm or less and a volume fraction f of the precipitate (f) is preferably 0.05% or greater.

In addition, the ferritic stainless steel may selectively comprise, as needed:
(1) at least one of Mo, Cu, V, and W in a total amount of 4% or less,
(2) at least one of Ti and Al in a total amount of 0.4% or less,
(3) at least one of Ni and Co in a total amount of 5% or less, and
(4) at least one of REMs (rare earth metals) and Ca in a total amount of 0.2% or less.

When the stainless steel comprises Ti, a solute Nb content is expressed by the following value A', and the value A' may be 0.10 or greater.

$$A'=Nb-C\times 92.9/2/12$$

Advantage of the Invention

The present invention makes it possible to provide a ferritic stainless steel excellent in brazing ability with Ni-based filler metal or Cu-based filler metal, corrosion resistance against gas condensate, crevice corrosion resistance under aqueous environment, and ductility/toughness. Using this steel, a heat exchanger can be provided at a lower material cost than a conventional heat exchanger using an austenitic stainless steel for their members.

MODE FOR CARRYING OUT THE INVENTION

Figure 1:
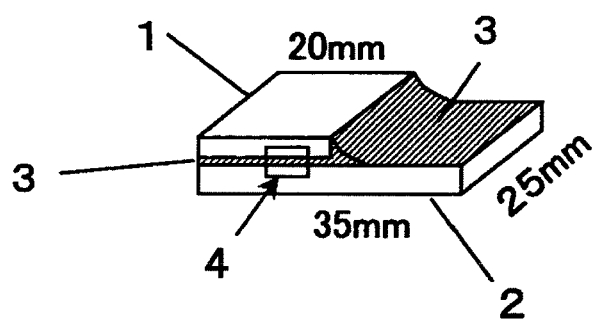
FIG. 1 shows the appearance of a brazing test piece.

As described above, using a ferritic stainless steel is advantageous for reducing the cost of various members such as members of a heat exchanger. When a ferritic stainless steel is used, however, there is a fear of degradation in corrosion resistance under a gas condensate environment and in crevice corrosion resistance under an aqueous environment. When brazing with Ni-based filler metal or Cu-based filler metal, or torch brazing with brass-based filler metal, or the like is performed, a ferritic stainless steel is kept at temperatures as high as from about 1000 to 1150° C. It is therefore important to appropriately design the composition of the ferritic stainless steel in order to suppress coarsening of crystal grains. Described specifically, when a ferritic stainless steel is placed under such a high temperature condition, crystal grains of it grow and are likely to become coarse. The stainless steel having coarsened crystal grains has a deteriorated fatigue property and is easily damaged due to oscillation or external impact. It has been found based on the study by the present inventors that in order to avoid such a problem, the average diameter of ferrite crystal grains should be controlled not to exceed 500 μm. Accordingly, when a ferritic stainless steel is used for applications to be brazed, it is necessary to design the composition of the ferritic stainless steel so as to prevent growth of crystal grains even at high temperatures.

The present inventors have found that a solute Nb favorably acts on the corrosion resistance of a ferritic stainless steel under an environment of gas condensate or crevice corrosion resistance under an aqueous environment. It has been found that when a passivation film covering the surface of stainless steel is broken due to corrosion, Nb has a high repairing capacity of the passivation film.

Additionally, the present inventors have found that a solute Nb also effectively acts to suppress coarsening of crystal grains of a ferritic stainless steel. The study by the present inventors revealed that when the lower limit of a brazing temperature is set at 1000° C., a Nb content required to secure an amount of a solute Nb necessary for suppressing coarsening of crystal grains in a ferritic stainless steel is at least 0.15%. The solute Nb suppresses coarsening of crystal grains presumably because of a drag effect which will be described later, but not limited thereto.

Further, the suppression of coarsening of crystal grains by the addition of Nb, is due to not only the coarsening suppressive action resulting from the drag effect, produced by the solute Nb, that inhibits diffusion of another element but also highly due to a pinning effect, produced by a Nb carbonitride, that suppresses the grain growth. Accordingly, in designing the composition in the present invention, it is advantageous to retain certain C and N contents. More specifically, it is effective to adjust a total content of C and N to 0.01% or greater. In addition, by retaining a sufficient Nb content, a pinning effect produced by precipitates such as $Fe_2Nb$ (Laves phase) and $Fe_3NbC$ also effectively acts to suppress coarsening of crystal grains. Suppression of coarsening of crystal grains upon brazing is effective for preventing deterioration in toughness or ductility.

The drag effect and pinning effect will next be described.
[Drag Effect]

Crystal grain growth accompanies the migration of a crystal grain boundary. When a solid solution element or impurity element that is liable to accumulate on the crystal grain boundary is contained in a matrix, the crystal grain boundary need to migrate with these atoms, making migration difficult (drag effect). Focusing on this drag effect, the present inventors have found that crystal grain growth can be suppressed by intentionally causing a solid solution element to exist on the crystal grain boundary and thereby inhibiting the migration of crystal grain boundary. As a result of extensive investigation on the crystal grain growth of a ferritic stainless steel at high temperatures, they have found that in the case of a ferritic stainless steel, among solute elements of solid solution, solute Nb is particularly effective for suppressing crystal grain growth.

However, Nb is an element easily combined with C or N, thus Nb atoms capable of being a solute Nb, among the Nb atoms in the stainless steel, are only Nb atoms remaining unused after formation of a Nb carbonitride. Accordingly, an amount of Nb capable of being a solute of solid solution in a stainless steel can be expressed by using the value A as in the following equation:

$$A=Nb-(C\times92.9/12+N\times92.9/14).$$

In the above formula, C and N represent contents of C and N (mass %) in a stainless steel, respectively.

When a ferritic stainless steel contains Ti, almost no Nb nitride is formed, since N is used mainly for the formation of TiN. On the other hand, since Ti carbide and Nb carbide are formed with the same probability, when a Ti content (mole) is greater than a total of a C content and a N content (each, mole) (Ti content (mole)>(C content (mole)+N content (mole))), an amount of Nb capable of being a solute of solid solution can be expressed by the value A' as in the following equation:

$$A'=Nb-C\times(92.9/12)/2$$

It has been found that when a Nb amount capable of forming a solid solution represented by the value A or A' (for the case where a Ti content in ferritic stainless steel is greater than a total content of C and N) is 0.10 or greater, a drag effect due to a solute Nb appears effectively when the ferritic stainless steel is heated at high temperatures and inhibits migration of a grain boundary and as a result, it can suppress coarsening of crystal grains of a ferritic stainless steel at high temperatures (at the time of brazing or the like).

The values A and A' are preferably 0.2 or greater, more preferably 0.25 or greater.
[Pinning Effect]

It is known that finely dispersed precipitates in a metal matrix become an obstacle for dislocation movement and cause a so-called precipitation strengthening phenomenon. It has been found that these precipitates inhibit migration of a grain boundary migration at high temperatures (pinning effect).

The degree of the pinning effect can be expressed by d/f wherein d (μm) represents the maximum diameter of precipitates and f represents a volume fraction (%) of the precipitates. The smaller the precipitates and the greater their amount results in higher pinning effect. The present inventors evaluated coarsening of crystal grains of a steel having a precipitate volume fraction f of from 0.05 to 0.20% while changing the diameter d (μm) of the precipitates. As a result, it has been found that when d/f becomes 5 or greater, the crystal grain diameter of the stainless steel becomes 500 μm or greater by the brazing treatment. In the present invention, it is therefore preferred to control the amount and diameter of the precipitates to give d/f of 5 or less. In other words, the smaller the grain diameter of each precipitate and the greater the total volume fraction of the precipitates results in the greater the pinning effect.

In order to obtain fine dispersion of the precipitates, it is important to suppress coarsening of the precipitates during heating or cooling upon production of a stainless steel. It has been found that precipitates having a maximum diameter of 0.25 μm or less can be obtained by adjusting a take-up temperature in a hot rolling step to less than 750° C., while, in an annealing step, adjusting an average heating rate from 600° C. to a maximum attained temperature Tm to 10° C./s or greater and an average cooling rate from Tm to 600° C. to 10° C./s or greater. In this case, when the volume fraction f is 0.05 or greater, a pinning effect necessary for the present invention can be attained.

In the present invention, the precipitates are preferably controlled to have a maximum diameter d of 0.25 µm or less and a volume fraction f of 0.05% or greater.

The term "maximum diameter d (µm) of precipitates" as used herein means the maximum grain diameter of the precipitates that appear on the cross-section when the cross-section of a steel material is polished. The term "grain diameter" means a long side of a circumscribed rectangle of a grain having a minimum area among circumscribed rectangles of the grain. The term "volume fraction f (%)" means a quotient, in terms of percent, obtained by dividing a total area of all the precipitates appearing on the polished cross-section of the steel material with an area of an observed field. In any measurement, the cross-section can be observed using a scanning electron microscope (SEM) or the like and an area of the observed field is set at $2 \times 10^{-2}$ mm$^2$ or greater.

Precipitates particularly effective in the pinning effect are Nb-based precipitates. Examples of them include Nb carbide, Nb nitride, and Nb carbonitride (which may hereinafter be called "Nb carbide/nitride", collectively), Fe$_2$Nb (Laves phase), and Fe$_3$NbC.

It has been found that with respect to alloy components other than Nb, Mo and W have a drag effect and therefore are effective for suppressing coarsening of crystal grains and in addition, precipitates such as Ti or TiC have a pinning effect.

It has also been found that Ni, Co, and Cu are greatly effective for suppressing deterioration of toughness when ferrite grains become coarse upon brazing. It has been found, on the other hand, that Ti, Al, Zr, REM, and Ca have a factor for deteriorating the flow of brazing filler metal on the surface of a steel material upon brazing with Ni-based filler metal or Cu-based filler metal. This is presumed to occur because oxides of these elements are likely to be formed on the surface of the stainless material upon heating for brazing. As will be described later, however, no problem occurs if the contents of these elements are controlled within an appropriate range.

Based on such findings, the present invention has been completed. The reason for defining ranges of respective alloy elements constituting the ferritic stainless steel of the present invention will next be described. Incidentally, the unit "%" for the content of a component element means "mass %" unless otherwise specifically indicated.

Elements C and N combine with Nb, consume Nb added to the steel, and thereby form a Nb carbide/nitride. Consumption of Nb and reduction in an amount of Nb capable of forming a solid solution may inhibit a corrosion resistance improving effect and a crystal-grain coarsening suppressing effect which will otherwise be produced by a solute Nb. In the invention, it is therefore necessary to limit the content of C to 0.03 mass % or less, preferably 0.025 mass % or less. It is also necessary to limit the content of N to 0.03 mass % or less, preferably 0.025 mass % or less.

As described above, however, the Nb carbide/nitride can contribute to inhibition of coarsening of crystal grains by its pinning effect upon brazing with Ni-based filler metal or Cu-based filler metal. It is therefore desired to keep the contents of C and N so as not to damage the corrosion resistance. More specifically, from the standpoint of the pinning effect, a total content of C and N is adjusted to 0.01% or greater, while contents of C and N are desirably maintained at 0.005 mass % or greater and 0.005 mass % or greater, respectively.

An element Si improves the pitting corrosion resistance of a ferritic stainless steel. An excess Si content however hardens the ferrite phase and becomes a workability deteriorating factor. It also deteriorates wettability upon brazing with Ni or Cu-based filler metal. The Si content is therefore adjusted to 3 mass % or less. The Si content preferably exceeds 0.1% from the standpoint of improving the corrosion resistance. The Si content falls within a range of preferably from 0.2 to 2.5 mass % and its upper limit can be set to 1.5 mass %.

An element Mn is used as a deoxidizing agent of a stainless steel. Mn however becomes a factor of decreasing the Cr concentration in the passivation film and causing deterioration of corrosion resistance so that the Mn content is preferably lower. The Mn content is set at 2 mass % or less. Mixing of Mn to some extent is inevitable in a stainless steel using scraps as raw materials so that the Mn content should be controlled so as not to be excessive.

The content of P is desirably lower because it impairs the toughness of the base material and the brazed portion. In melting of a Cr-containing steel, it is difficult to dephosphorize it by refining. Careful selection of raw materials for extremely reducing the content of P requires an excessive cost increase. In the present invention, similar to conventional ferritic stainless steels, the content of P up to 0.05 mass % is therefore permissible.

An element S forms MnS which easily becomes a starting point of pitting corrosion and thereby inhibits corrosion resistance. When S content is high, high-temperature cracks are likely to occur at the brazed portion so that S content S is set at 0.03 mass % or less.

An element Cr is a main constituent of a passivation film and improves local corrosion resistance such as pitting corrosion resistance or crevice corrosion resistance. A pipe member constituting a heat exchanger or refrigerant pipe is required to have a Cr content of 11% or greater. An increase in the Cr content however makes it difficult to decrease the C and N contents, impairs mechanical properties or toughness, and becomes a cause for cost increase. In the present invention, therefore, the Cr content is from 11 to 30%, preferably from 17 to 26%.

An element Nb is important in the present invention. As described above, it is excellent in re-passivation ability from the standpoint of corrosion resistance and effectively acts to suppress coarsening of crystal grains upon brazing with Ni or Cu-based filler metal. Described specifically, the drag effect of a solute Nb and the pinning effect of the Nb carbide/nitride effectively act on them. In order to produce these effects sufficiently, it is important to adjust the C and N contents within the above-described ranges and keep the Nb content at 0.15 mass % or greater. In particular, an increase in the Nb content is effective for suppressing coarsening of crystal grains upon brazing with Ni or Cu-based filler metal. The Nb content is preferably 0.3% or greater, more preferably 0.4% or greater, still more preferably 0.5% or greater. An excessive increase in the Nb content however has an adverse effect on the hot workability or surface quality characteristics of steel materials. The Nb content is therefore limited to be 0.8 mass % or less. The Nb content in a range of from 0.15 to 0.3 mass % is effective for suppressing grain growth at a relatively low brazing temperature of 1000° C., and Nb is preferably added with Ti to stabilize the effect.

The element Mo is, as well as Cr, effective for improving the corrosion resistance level and it is known that with an increase in the Cr content, Mo has a greater corrosion resistance action.

The elements Mo, Cu, V, and W improve acid resistance of a stainless steel and improve corrosion resistance. Further, they are effective for preventing coarsening of crystal grains of ferrite at a brazing temperature. Mo, V, and W have a drag effect as solutes Mo, V, and W and a pinning effect with precipitates, while Cu has a pinning effect due to precipitation as a ε Cu phase. In the present invention, it is preferred to add at least one of these elements. In particular, it is effective for setting a total content of these element to 0.05 mass % or greater. Excessive addition of these elements however has adversely affect on the hot workability. Based on various investigations, when at least one of Mo, Cu, V, and W is added, a total content should be adjusted to 4 mass % or less.

Of Ti and Al, Ti has, similar to Nb, a strong affinity with C and N and is expected to form a fine Ti carbonitride and bring an effect of suppressing crystal grain growth upon brazing.

The element Al is effective as a deoxidizing agent and addition of it together with Ti inhibits deterioration of corrosion resistance when brazing causes oxidation. In particular, it is effective to adjust a total content of Ti and Al to 0.03% or greater.

Addition of any of these elements in a large amount may cause deterioration of hot workability or surface characteristics. In addition, these elements are easily oxidative elements so that a firm oxide film is sometimes formed on the surface of a steel material when heated upon final annealing or brazing. The resulting oxide film deteriorates the flow of filler metal upon brazing or reduces bonding strength after brazing. When brass-based filler metal is used, oxide films other than those of Ti and Al can be removed by the reducing action of Zn contained in the filler metal, but due to stronger affinity of Ti and Al with oxygen than Zn, the oxide films of Ti and Al cannot be removed. As a result of investigation, when at least one of Ti and Al is added, a total content (a total content of Ti and/or Al, and Zr when Zr is added) is limited to 0.4 mass % or less in order to avoid the problems due to an oxide film. In particular, it is effective to adjust the total content within a range of from 0.03 to 0.3 mass %, more preferably from 0.03 to 0.25 mass %.

Elements Ni and Co are markedly effective for suppressing reduction of toughness when ferrite crystal grains become coarse upon brazing. This toughness reduction suppressing effect is exhibited also when the average crystal grain diameter has not increased (for example, the average grain diameter of ferrite crystal grains is 500 μm or less). It is therefore possible to add at least one of these elements as needed. It is more effective to keep a total content of Ni and Co at 0.5 mass % or greater from the standpoint of suppressing reduction of toughness. Excessive addition of Ni and Co is however not preferred because it leads to formation of an austenite phase in a high temperature region and adversely affects the hot workability. When at least one of Ni and Co is added, a total content of Ni and Co should be adjusted to fall within a range of 5 mass % or less.

It has been confirmed that with regards to corrosion resistance against a condensate of an exhaust gas or under a chlorine-rich aqueous environment, the ferritic stainless steel having a composition as described above is comparable to austenitic steels used for conventional heat exchanger members and has no problem. In addition, in the ferritic stainless steel of the present invention, the crystal-grain coarsening suppressive effect upon brazing with Ni or Cu-based filler metal and a brazing ability have been improved simultaneously.

The ferritic stainless steel of the present invention can be produced by melting a steel having a composition defined in the present invention and then carrying out the same procedure as that employed for ordinary ferritic stainless steels. Upon production, it is preferred to control the maximum diameter and the volume fraction of precipitates so as to produce a pinning effect fully for suppressing coarsening of crystal grains.

In the ferritic stainless steel of the present invention, a steel sheet can be obtained by a process including hot rolling, cold rolling, and finishing annealing. When hot rolling and finishing annealing are performed so as to satisfy the below-described conditions [1] and [2], it is possible to realize a precipitate distribution under which a good pinning effect is produced, that is, a precipitate distribution under which a maximum diameter d of precipitates is 0.25 μm or less and a volume factor f of the precipitates is 0.05% or greater.

[1] In hot rolling, a take-up temperature is adjusted to less than 750° C.

[2] In finishing annealing, an average heating rate from 600° C. to the maximum attained temperature Tm in a heating procedure is adjusted to 10° C./s or greater and an average cooling rate from Tm to 600° C. in a cooling procedure is adjusted to 10° C. or greater.

Various members such as members of a heat exchanger can be obtained by brazing steel plates made of the ferritic stainless steel of the present invention to form a stainless steel joint. No limitation is imposed on the brazing filler metal to be used therefor and known brazing filler metals, for example, Ni-based filler metal, Cu-based filler metal, phosphor copper-based filler metal, brass-based filler metal, and silver-based filler metal can be used. Since in the ferritic stainless steel of the present invention, coarsening of crystal grains upon heating at high temperatures is suppressed, it is advantageously used when brazing is performed with brazing filler metal requiring a high brazing temperature such as phosphor copper-based filler metal and brass-based filler metal. A brazing method is also not limited and known methods such as torch brazing may be employed.

When the ferritic stainless steel (sheet) of the present invention is subjected to torch brazing with brass-based filler metal, torch brazing may be performed after removing an oxide film from the surface by using a flux composed mainly of hydrofluoric acid and boric acid, in the same way as the method employed for ordinary stainless steels. By carrying out torch brazing while setting the maximum attained temperature and heating time of the base material to satisfy the following conditions [3] and [4], a stainless steel joint in which precipitates have produced a pinning effect effectively and an average crystal grain diameter of the base material matrix has been suppressed to 500 μm or less even after brazing and which has excellent strength properties is available.

[3] The maximum attained temperature of a base material upon brazing is set at less than 1000° C.

[4] Heating time upon brazing is set at less than 3 minutes.

EXAMPLES

A hot rolled sheet having a sheet thickness of 3 mm was prepared by melting a stainless steel having a chemical composition as shown in Table 1 and then hot rolling the resulting steel. Then, the hot rolled sheet was thinned to a sheet thickness of 1.0 mm by cold rolling, subjected to finishing annealing at a maximum attained temperature Tm of from 1000 to 1070° C. for a retention time of from 1 to 60 seconds, and pickled. Thus, a specimen was prepared.

Hot rolling and finishing annealing of all the Invention Steels except Invention steels 19 and 20 were performed under the conditions satisfying those described in [1] and [2]. Invention steel 19 had the same chemical composition as that of Invention steel 10, but it was taken-up at 880° C. in hot rolling. Invention steel 20 had the same chemical composition as that of Invention steel 15, but it was cooled at a cooling rate of 1° C./s from Tm to 600° C. in a cooling procedure upon finishing annealing.

Incidentally, Comparative steel 6 is an austenitic stainless steel.

TABLE 1

| Division | No. | C | Si | Mn | P | S | Ni | Cr | Nb | Ti | Al | N |
|---|---|---|---|---|---|---|---|---|---|---|---|---|
| Invention steel | 1 | 0.012 | 0.31 | 0.28 | 0.028 | 0.003 | — | 18.31 | 0.45 | — | — | 0.010 |
| | 2 | 0.009 | 0.25 | 0.36 | 0.030 | 0.002 | — | 18.21 | 0.43 | — | — | 0.012 |
| | 3 | 0.009 | 0.30 | 0.31 | 0.028 | 0.001 | — | 18.08 | 0.40 | — | — | 0.009 |
| | 4 | 0.010 | 0.29 | 0.33 | 0.029 | 0.002 | — | 18.15 | 0.42 | — | — | 0.011 |
| | 5 | 0.015 | 0.52 | 0.31 | 0.027 | 0.007 | — | 18.22 | 0.41 | — | — | 0.009 |
| | 6 | 0.009 | 0.33 | 1.03 | 0.028 | 0.002 | 0.20 | 18.19 | 0.62 | — | — | 0.008 |
| | 7 | 0.004 | 0.42 | 0.21 | 0.032 | 0.003 | — | 22.08 | 0.42 | — | 0.03 | 0.012 |
| | 8 | 0.009 | 0.22 | 0.25 | 0.030 | 0.020 | — | 18.22 | 0.28 | 0.18 | — | 0.011 |
| | 9 | 0.006 | 0.08 | 1.24 | 0.034 | 0.023 | 1.45 | 19.34 | 0.18 | 0.34 | — | 0.011 |
| | 10 | 0.006 | 0.20 | 0.18 | 0.033 | 0.002 | 0.16 | 22.12 | 0.20 | 0.17 | 0.07 | 0.014 |
| | 11 | 0.008 | 2.32 | 0.34 | 0.031 | 0.004 | 0.32 | 23.22 | 0.43 | — | — | 0.012 |
| | 12 | 0.011 | 1.23 | 0.23 | 0.029 | 0.002 | 0.21 | 19.45 | 0.56 | — | 0.11 | 0.015 |
| | 13 | 0.004 | 0.29 | 0.29 | 0.043 | 0.001 | 2.43 | 23.23 | 0.32 | — | — | 0.013 |
| | 14 | 0.006 | 0.28 | 0.19 | 0.030 | 0.001 | 0.51 | 23.91 | 0.20 | 0.28 | 0.09 | 0.016 |
| | 15 | 0.009 | 0.62 | 0.23 | 0.029 | 0.010 | 0.23 | 22.45 | 0.34 | 0.24 | 0.11 | 0.016 |
| | 16 | 0.005 | 0.34 | 0.43 | 0.032 | 0.007 | — | 20.45 | 0.45 | — | — | 0.010 |
| | 17 | 0.007 | 0.23 | 0.45 | 0.033 | 0.002 | — | 11.78 | 0.42 | — | — | 0.008 |
| | 18 | 0.012 | 0.48 | 0.29 | 0.027 | 0.011 | — | 29.22 | 0.36 | — | — | 0.011 |
| | 19 | 0.006 | 0.08 | 1.24 | 0.034 | 0.023 | 1.45 | 19.34 | 0.18 | 0.18 | — | 0.011 |
| | 20 | 0.006 | 0.28 | 0.19 | 0.030 | 0.001 | 0.51 | 23.91 | 0.20 | 0.20 | 0.09 | 0.016 |
| Comparative steel | 1 | <u>0.038</u> | 0.21 | 0.32 | 0.034 | 0.003 | 0.43 | 19.43 | <u>0.13</u> | — | — | 0.013 |
| | 2 | 0.011 | 3.45 | 0.31 | <u>0.062</u> | 0.011 | 0.21 | 21.30 | <u>0.07</u> | 0.52 | 0.14 | <u>0.041</u> |
| | 3 | 0.004 | 0.45 | <u>2.45</u> | 0.041 | 0.005 | 1.23 | 22.00 | <u>0.91</u> | 0.23 | — | 0.007 |
| | 4 | 0.010 | 0.13 | <u>0.23</u> | 0.035 | 0.040 | 0.32 | 21.23 | 0.34 | — | <u>0.43</u> | 0.008 |
| | 5 | 0.004 | 0.14 | 0.28 | 0.022 | 0.004 | 0.32 | <u>9.23</u> | 0.43 | — | — | 0.007 |
| | 6 | 0.015 | 0.53 | 1.74 | 0.027 | 0.004 | 12.01 | <u>17.33</u> | — | — | 0.03 | 0.008 |

| Division | No. | Mo | Cu | W | V | Co | C + N | A | A' | f(%) | d(μm) |
|---|---|---|---|---|---|---|---|---|---|---|---|
| Invention steel | 1 | — | — | — | — | — | 0.022 | 0.29 | — | 0.16 | 0.15 |
| | 2 | — | 0.47 | — | — | — | 0.021 | 0.28 | — | 0.15 | 0.21 |
| | 3 | — | — | — | 0.24 | — | 0.018 | 0.27 | — | 0.13 | 0.15 |
| | 4 | — | — | 0.25 | — | — | 0.021 | 0.27 | — | 0.15 | 0.18 |
| | 5 | — | 0.45 | — | — | 1.45 | 0.024 | 0.23 | — | 0.18 | 0.12 |
| | 6 | 2.01 | 0.22 | — | — | — | 0.017 | 0.50 | — | 0.13 | 0.15 |
| | 7 | 0.68 | 0.18 | — | 0.18 | — | 0.016 | 0.31 | — | 0.11 | 0.13 |
| | 8 | 0.95 | — | 0.22 | — | — | 0.020 | — | 0.25 | 0.07 | 0.14 |
| | 9 | 0.89 | — | — | — | — | 0.017 | — | 0.16 | 0.06 | 0.16 |
| | 10 | 1.04 | — | — | — | — | 0.020 | — | 0.18 | 0.05 | 0.14 |
| | 11 | — | 1.22 | 2.11 | — | — | 0.020 | 0.29 | — | 0.14 | 0.13 |
| | 12 | 2.43 | — | — | 0.12 | — | 0.026 | 0.38 | — | 0.18 | 0.18 |
| | 13 | <0.01 | — | — | — | — | 0.017 | 0.20 | — | 0.12 | 0.11 |
| | 14 | 0.49 | — | — | — | — | 0.022 | — | 0.18 | 0.06 | 0.19 |
| | 15 | 1.01 | — | — | 0.34 | — | 0.025 | — | 0.31 | 0.07 | 0.17 |
| | 16 | 0.91 | — | — | — | — | 0.015 | 0.34 | — | 0.11 | 0.18 |
| | 17 | — | — | — | 0.23 | — | 0.015 | 0.31 | — | 0.15 | 0.18 |
| | 18 | — | 0.56 | — | 0.18 | — | 0.023 | 0.19 | — | 0.13 | 0.18 |
| | 19 | 0.89 | — | — | — | — | 0.017 | — | 0.16 | 0.02 | 0.10 |
| | 20 | 0.49 | — | — | — | — | 0.022 | — | 0.18 | 0.07 | 0.30 |
| Comparative steel | 1 | — | — | — | 0.32 | — | 0.051 | <u>−0.25</u> | — | 0.38 | 0.16 |
| | 2 | 3.56 | — | — | — | — | 0.052 | — | 0.03 | 0.06 | 0.15 |
| | 3 | 0.91 | — | 1.23 | — | — | 0.011 | — | 0.88 | <u>0.02</u> | 0.14 |
| | 4 | 0.92 | — | — | — | 0.43 | 0.018 | 0.21 | — | 0.13 | 0.13 |
| | 5 | — | — | — | — | — | 0.011 | 0.35 | — | 0.10 | 0.17 |
| | 6 | 2.17 | 0.34 | — | — | — | 0.023 | — | — | — | — |

Underlined: outside the range defined in the invention

The following characteristics were studied using the steel materials thus obtained.

"Maximum Size and Volume Fraction f of Precipitates"

Each of the steel materials was cut and the electrolytically-polished surface of its cross-section was observed through SEM. The observation was continued until the total area of the observed field became $2\times10^{-2}$ mm². Of the precipitates thus observed, the grain diameter of the precipitate having the largest grain diameter was designated as the maximum diameter d (μm).

In the same way, the cross-section in the observed field of $2\times10^{-2}$ mm² was observed and an area S (mm²) of all the precipitates present in the observed field was measured using image processing and a volume fraction f was calculated according to the following equation:

$$f(\%) = S/(2\times10^{-2}) \times 100$$

With respect to the discrimination of the precipitates, surface analysis was performed using EDX and portions showing a higher detection intensity of Nb, Ti, Mo, Cu, V, or W than the matrix portion were regarded as precipitates. The values thus obtained are shown in Table 1.

"Brazing Ability"

First, a Ni-based filler metal paste and a Cu-based filler metal paste were applied, respectively, to give a thickness of 0.3 mm between two test pieces with different sizes (a lower one: 35×25 mm, an upper one: 20×25 mm) as shown in FIG. 1. Brazing treatment was performed in vacuum under the conditions shown in the following table while keeping these two plates aligned horizontally.

TABLE 2

| | Heating time | Brazing temperature | Retention | Cooling | Kind of filler metal |
|---|---|---|---|---|---|
| Ni—based filler metal | 3.5 h | 1150° C. | 30 min | Outside the furnace | BNi-5 (Ni—19Cr—10Si) JIS 3265 |
| Cu—based filler metal | 3.5 h | 1120° C. | 90 min | Air cooling | BCu-1 (Cu) JIS Z3262 |

The test piece was taken out from the furnace and a filler metal covering ratio was determined by dividing an area of a portion of the upper surface of the 20×25 mm upper test piece, where said portion is wetted with the filler metal, with an area of the test piece. The test piece having a filler metal covering ratio of 50% or greater was rated A, that having a filler metal covering ratio of 20% or greater but less than 50% was rated B, and that having a filler metal covering ratio of less than 20% was rated C. The test pieces having a rating equal to or higher than B were judged acceptable.

"Crystal Grain Diameter after Heat Treatment for Brazing"

The metal structure (4) of the cross-section (refer to FIG. 1) of each of the test pieces which had been used for evaluating brazing ability was observed through an optical microscope. Etching was conducted with a mixed acid of hydrofluoric acid and nitric acid. The crystal grain diameter was determined using the section method and the test piece having a grain diameter of 200 μm or less was rated A, that having a grain diameter exceeding 200 μm but not greater than 500 μm was rated B, and that having a grain diameter exceeding 500 μm was rated C. The test pieces rated A and B were judged acceptable.

"Condensate Test on a Material Heat Treated for Brazing with Ni-Based Filler Metal"

Figure 2:
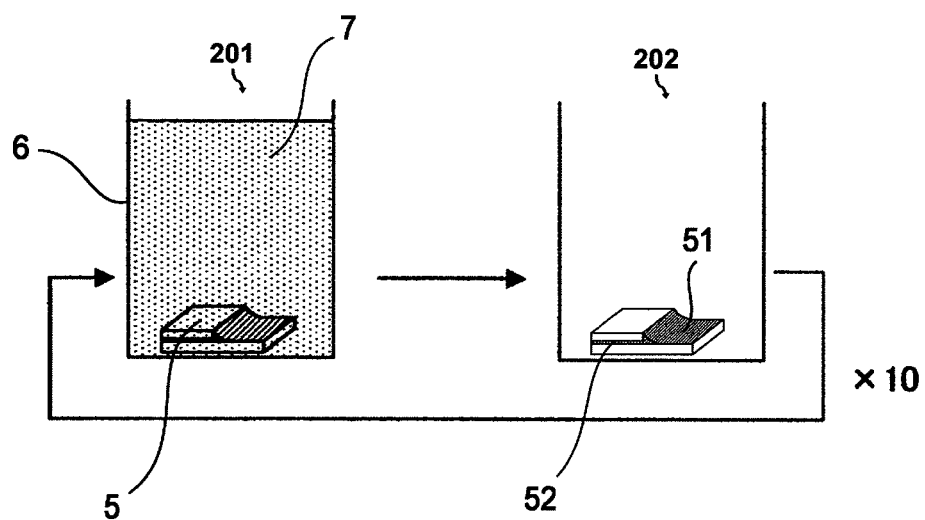
FIG. 2 shows conditions of the condensate test

With regards to the test piece which had been used for evaluating brazing ability, the upper surface of the 20×25 mm upper test piece onto which the brazing filler metal had invaded was polished with #600 and then, as illustrated in FIG. 2, the test piece (5) was subjected to a 10-cycle test, each cycle consisting of (201) dipping the test piece (5) in 100 ml of simulated drain water (7), contained in a 200 ml beaker (6) (with 100 ppm $HNO_3$, 20 ppm $H_2SO_4$, 1 ppm $Cl^-$), which is prepared on the assumption of having components contained in the composition of a water heating gas, and (202) placing the test piece in an environmental tester of 130° C. for about 7 hours corresponding to a period the test piece dries, and washing with water. The presence or absence of corrosion of the stainless raw material and brazing filler metal were determined.

"Crevice Corrosion Condensate Test under Aqueous Environment on a Material Heat Treated for Brazing with Ni-Based Filler Metal"

With regards to the above-described test pieces which had been used for evaluating brazing ability, the upper surface of the 20×25 mm upper test piece onto which the brazing filler metal had invaded was polished with #600 and then, dipped in 2000 ppm Cl+10 ppm Cu for 24 hours. A test piece having a maximum corrosion depth less than 0.1 mm was rated o and that having a maximum corrosion depth exceeding 0.1 mm was rated x.

"Crystal Grain Diameter after Heat Treatment Equivalent to Torch Brazing"

When torch brazing is performed with brass-based filler metal, the brazing temperature is about 900° C. The temperature of a material to be brazed increases to 1000° C. or greater by preliminary heating or the like and it reaches even about 1100° C. in the vicinity of the surface with which a flame is brought into direct contact. A further heat history such as overheating or re-brazing due to joint failure may be applied to the material. Accordingly, a 30×mm×80 mm test piece was cut out from each steel material and heated at 1100° C. for 10 minutes as a heat treatment equivalent to torch brazing. The edge surface of the test piece after the heat treatment was polished, etched with a mixed acid prepared using hydrofluoric acid and nitric acid, and observed through an optical microscope. An average crystal grain diameter was determined by the section method.

The test piece having an average crystal grain diameter of 200 μm or less was rated A (a markedly good coarsening suppressive effect was produced), that having an average crystal grain diameter exceeding 200 μm but not greater than 500 μm was rated B (a good coarsening suppressive effect was produced), that having an average crystal grain diameter exceeding 500 μm but not greater than 1000 μm was rated C (a coarsening suppressive effect was produced), and that having an average crystal grain diameter exceeding 1000 μm was rated D (a sufficient coarsening suppressive effect was not produced). The result rated B is presumed to have no problem when used in practice as a member for heat exchangers, a pipe member, and the like.

[Torch Brazing Ability with Brass-Based Filler Metal]

Figure 3:
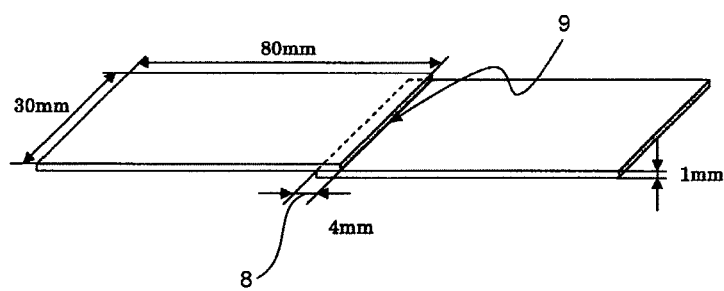
FIG. 3 shows an overlapping manner of test pieces in torch brazing.

From each sheet of steel material having a sheet thickness of 1 mm, 30 mm×80 mm test pieces were cut out. They were overlapped each other as illustrated in FIG. 3 with an overlap space (8) of 4 mm and joined by torch brazing from one side (9) while using a flux. Incidentally, brass-based filler metal (a BCuZn-1 (60Cu—0.1Sn—Zn alloy) wire) was used as brazing filler metal and a $H_3BO_4$-$KB_4O_7$-KF-$KBF_4$ flux ordinarily used in brazing of a stainless steel was used as the flux. The test piece thus joined was stretched in a longitudinal direction by using a tensile tester until breakage occurs. The test piece is broken at the base material portion when good torch brazing is performed. Accordingly, the test piece broken at the base material portion was rated o (showing that the torch brazing ability was good) and that broken at the filler metal portion was rated x (showing that the torch brazing ability was bad).

"Outer-Surface Corrosion Resistance after Torch Brazing"

In order to evaluate the corrosion resistance of the outer surface of a pipe when the stainless steel of the present invention was used for the pipe member, the test piece which was subjected to the above-described heat treatment equivalent to the torch brazing was subjected to 10 cycles of a salt wetting and drying test, each cycle consisting of spraying hydrochloric acid, drying, and wetting, and a rust area ratio was measured. The rust area ratio was determined by taking a picture of the appearance after the test and then dividing an area of a rust portion other than the edge surface with an area of the entire sample.

The test piece having a rust area ratio of 1% or less was rated o (showing good outer-surface corrosion resistance) and that having a rust area ratio exceeding 1% was rated x (showing poor outer-surface corrosion resistance).

The brazing ability with Ni/Cu-based filler metal, crystal grain diameter after heat treatment for brazing with Ni/Cu-based filler metal, results of the condensate test on a material heat treated for brazing with Ni-based filler metal, and results of the crevice corrosion condensate test under aqueous environment on a material heat treated for brazing with Ni-based filler metal are shown in Table 3. The crystal grain diameter after heat treatment equivalent to torch brazing, torch brazing ability with brass-based filler metal material, and outer-surface corrosion resistance after torch brazing are shown in Table 4.

As is apparent from Table 3, the ferritic stainless steels of the present invention has brazing ability with Ni or Cu-based filler metal which has conventionally been used for heat exchanger members, inhibit coarsening of crystal grains, and are excellent in corrosion resistance against condensate having a gas composition or under aqueous environment, and thus can have sufficient properties as a member for heat exchangers.

Since Comparative Steels 1 and 2, on the other hand, have a small Nb content and the effect of a Nb precipitate or solute Nb is not produced upon brazing, grain growth is likely to occur. Comparative steel 1 has a large carbon content and therefore a sensitization phenomenon occurs due to precipitation of a carbide upon cooling for brazing. It has therefore a problem in corrosion resistance. The steel of Comparative Example 2 has a rich P or Mo content so that it has low toughness and in addition, due to a rich nitrogen content and a sensitization phenomenon, it has poor corrosion resistance against condensate having a gas composition or under aqueous environment. Further, its brazing ability is not acceptable because of a large Ti content. Comparative steel 3 has a problem in productivity because it has reduced ductility due to a martensite phase formed accompanying the formation of an austenite due to an increase in a Mn content or it has reduced toughness due to a high Nb content for heightening the strength. Comparative steel 4 was inferior in Ni or Cu brazing ability due to a problem of the surface condition due to excessive addition of Al.

On the other hand, Comparative Steels 1 and 2 having a small Nb content did not have a sufficient coarsening suppressive effect of ferrite crystal grains. The steel of Comparative Example 1 had a great C content so that a sensitization phenomenon occurred by heating for torch brazing and corrosion resistance was inferior. When brass-based filler metal was employed as a brazing filler metal, on the other hand, decarbonization occurred because of conversion of C in the steel into a CO gas so that the torch brazing ability with brass-based filler metal was good. Comparative steels 2 and 4 had a large total content of Ti and Al so that the joining strength after torch brazing was inferior.

The steel of Comparative Example 5 had a small Cr content so that the outer-surface corrosion resistance thereof did not meet the criterion which is required for the application of a pipe member.

TABLE 4

| Kind | No. | Crystal grain diameter after heat treatment equivalent to torch brazing | Torch brazing ability with brass-based filler metal | Outer surface corrosion resistance |
|---|---|---|---|---|
| Steel of the invention | 1 | B | ○ | ○ |
| | 2 | B | ○ | ○ |
| | 4 | A | ○ | ○ |
| | 5 | B | ○ | ○ |
| | 6 | A | ○ | ○ |
| | 7 | A | ○ | ○ |
| | 8 | B | ○ | ○ |

TABLE 3

| Kind | No. | Brazing ability with N—based filler metal | Brazing ability with Cu—based filler metal | Crystal grain diameter upon brazing with Ni—based filler metal | Crystal grain diameter upon brazing with Cu—based filler metal | Corrosion resistance after brazing with Ni—based filler metal | |
|---|---|---|---|---|---|---|---|
| | | | | | | Condensate test | Crevice corrosion condensate test under aqueous environment |
| Steel of the invention | 1 | A | A | B | B | ○ | ○ |
| | 2 | A | A | B | B | ○ | ○ |
| | 3 | A | A | A | A | ○ | ○ |
| | 4 | A | A | A | A | ○ | ○ |
| | 5 | A | A | B | B | ○ | ○ |
| | 6 | A | A | A | A | ○ | ○ |
| | 7 | A | A | A | A | ○ | ○ |
| | 8 | B | A | B | B | ○ | ○ |
| | 9 | B | B | B | B | ○ | ○ |
| | 10 | B | B | B | B | ○ | ○ |
| | 11 | A | A | A | A | ○ | ○ |
| | 12 | B | B | A | A | ○ | ○ |
| | 13 | A | A | B | B | ○ | ○ |
| | 14 | B | B | B | B | ○ | ○ |
| | 15 | B | B | A | B | ○ | ○ |
| | 16 | A | A | A | A | ○ | ○ |
| Comparative steel | 1 | A | A | C | C | ○ | ○ |
| | 2 | C | C | C | C | x | x |
| | 3 | B | B | A | A | ○ | ○ |
| | 4 | C | C | B | B | ○ | ○ |
| | 6 | A | A | A | A | ○ | ○ |

From Table 4, it has been confirmed that the invention steels are excellent in brazing ability (torch brazing ability) and coarsening of ferrite crystal grains has been suppressed.

In Invention steels 19 and 20, however, the coarsening suppressive effect of ferrite crystal grains is small because extreme production conditions are set such as very small volume fraction f of precipitates or very large maximum diameter of the precipitates.

TABLE 4-continued

| Kind | No. | Crystal grain diameter after heat treatment equivalent to torch brazing | Torch brazing ability with brass-based filler metal | Outer surface corrosion resistance |
|---|---|---|---|---|
| | 9 | A | ○ | ○ |
| | 10 | B | ○ | ○ |
| | 11 | A | ○ | ○ |

TABLE 4-continued

| Kind | No. | Crystal grain diameter after heat treatment equivalent to torch brazing | Torch brazing ability with brass-based filler metal | Outer surface corrosion resistance |
|---|---|---|---|---|
| | 12 | A | ○ | ○ |
| | 13 | B | ○ | ○ |
| | 14 | B | ○ | ○ |
| | 15 | A | ○ | ○ |
| | 16 | A | ○ | ○ |
| | 17 | A | ○ | ○ |
| | 18 | A | ○ | ○ |
| | 19 | C | ○ | ○ |
| | 20 | C | ○ | ○ |
| Comparative steel | 1 | D | ○ | x |
| | 2 | D | x | ○ |
| | 4 | B | x | ○ |
| | 5 | B | ○ | x |
| | 6 | A | ○ | ○ |

INDUSTRIAL APPLICABILITY

The ferritic stainless steels of the present invention have good corrosion resistance while preventing deterioration in ductility or toughness due to coarsening of crystal grains upon brazing so that they are suited for use in materials for various members such as members for heat exchanger or pipe members which are to be brazed and are required to have corrosion resistance.

DESCRIPTION OF REFERENCE NUMERALS

1. Upper-side test piece
2. Lower-side test piece
3. Brazing filler metal
4. A portion of a metal structure to be observed
5. Test piece
51. Surface
52. Interface
6. 200-ml Beaker
7. Simulated drain water
9. Overlap portion
10. Torch brazed direction

The invention claimed is:

1. A process for producing a ferritic stainless sheet, which comprises a ferritic stainless steel, the process comprising:
preparing the ferritic stainless steel;
carrying out hot rolling at a take-up temperature less than 750° C.;
carrying out finishing annealing under the condition that the average heating rate from 600° C. to a maximum attained temperature Tm in a heating procedure is 10° C./s or greater and that the average cooling rate from the maximum attained temperature Tm to 600° C. in a cooling procedure is 10° C./s or greater; and
brazing the ferritic stainless steel sheet and a brazing filler metal to form a stainless steel joint, wherein
the ferritic stainless steel comprises, on the basis of mass percent,
C: 0.03% or less,
Si: 3% or less,
Mn: 2% or less,
P: 0.05% or less,
S: 0.03% or less,
Cr: from 11 to 30%,
Nb: from 0.15 to 0.8%,
N: 0.03% or less, and
the balance is Fe and incidental impurities, and
the ferritic stainless steel has a value A determined by the following equation that is 0.10 or greater:

$$A = Nb - (C \times 92.9/12 + N \times 92.9/14)$$

a maximum diameter (d) of Nb-precipitates in the ferritic stainless steel is 0.25 μm or less, and the volume fraction (f) of the precipitates in the ferritic stainless steel is 0.05% or greater.

2. The process for forming a ferritic stainless steel sheet according to claim 1, the ferritic stainless steel further comprising at least one of Mo, Cu, V, and W in a total amount of 4% or less.

3. The process for forming a ferritic stainless steel sheet according to claim 1, the ferritic stainless steel further comprising at least one of Ti and Al in a total amount of 0.4% or less.

4. The process for forming a ferritic stainless steel sheet according to claim 1, the ferritic stainless steel further comprising at least one of Ni and Co in a total amount of 5% or less.

5. The process for forming a ferritic stainless steel sheet according to claim 1, the ferritic stainless steel comprising a total content of C and N that is 0.01% or greater.

6. The process for forming a ferritic stainless steel sheet according to claim 1, the ferritic stainless steel comprising from 0.1% to 3% Si.

7. The process for forming a ferritic stainless steel sheet according to claim 1, the ferritic stainless steel being for use in the manufacture of a member of heat exchangers or a member to be torch brazed.

8. The process for forming a ferritic stainless steel sheet according to claim 1, wherein the stainless steel sheet is brazed by the brazing filler metal.

9. The process for forming a ferritic stainless steel sheet according to claim 1, the ferritic stainless steel comprising at least one of Cu, Ni, and Co in an amount of 0%.

10. A process for producing a ferritic stainless sheet, which comprises a ferritic stainless steel, the process comprising:
preparing the ferritic stainless steel;
carrying out hot rolling at a take-up temperature less than 750° C.;
carrying out finishing annealing under the condition that the average heating rate from 600° C. to a maximum attained temperature Tm in a heating procedure is 10° C./s or greater and that the average cooling rate from the maximum attained temperature Tm to 600° C. in a cooling procedure is 10° C./s or greater; and
brazing the ferritic stainless steel sheet comprising the ferritic stainless steel and a brazing filler metal, to form a stainless steel joint, wherein the ferritic stainless steel comprises, on the basis of mass percent,
C: 0.03% or less,
Si: 3% or less,
Mn: 2% or less,
P: 0.05% or less,
S: 0.03% or less,
Cr: from 11 to 30%,
Nb: from 0.15 to 0.8%,
N: 0.03% or less, and
the balance is Fe and incidental impurities,
and the ferritic stainless steel has a Ti content (mol) that is greater than the total content (mol) of C and N, a value A' determined by the following equation that is 0.10 or greater:

$$A' = Nb - C \times (92.9/12)/2,$$

a maximum diameter (d) of Nb-precipitates in the ferritic stainless steel is 0.25μm or less, and a volume fraction (f) of the precipitates in the ferritic stainless steel is 0.05% or greater.

11. The process for forming a ferritic stainless steel sheet according to claim 10, the ferritic stainless steel being for use in the manufacture of a member of heat exchangers or a member to be torch brazed.

12. The process for forming a ferritic stainless steel sheet according to claim 10, the ferritic stainless steel comprising at least one of Cu, Ni, and Co in an amount of 0%.

13. The process for forming a ferritic stainless steel sheet according to claim 10, the ferritic stainless steel further comprising at least one of Mo, Cu, V, and W in a total amount of 4% or less.

14. The process for forming a ferritic stainless steel sheet according to claim 10, the ferritic stainless steel further comprising at least one of Ti and Al in a total amount of 0.4% or less.

15. The process for forming a ferritic stainless steel sheet according to claim 10, the ferritic stainless steel further comprising at least one of Ni and Co in a total amount of 5% or less.

16. The process for forming a ferritic stainless steel sheet according to claim 10, the ferritic stainless steel comprising a total content of C and N that is 0.01% or greater.

17. The process for forming a ferritic stainless steel sheet according to claim 10, the ferritic stainless steel comprising from 0.1% to 3% Si.

\* \* \* \* \*